(12) United States Patent
Yoshikata

(10) Patent No.: US 8,628,892 B2
(45) Date of Patent: Jan. 14, 2014

(54) SOLID OXIDE FUEL CELL AND MANUFACTURING METHOD THEREOF

(75) Inventor: Kuniaki Yoshikata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1313 days.

(21) Appl. No.: 12/238,950

(22) Filed: Sep. 26, 2008

(65) Prior Publication Data

US 2009/0092877 A1    Apr. 9, 2009

(30) Foreign Application Priority Data

Sep. 28, 2007  (JP) ................. 2007-253302
Sep. 28, 2007  (JP) ................. 2007-253316

(51) Int. Cl.
*H01M 8/10*  (2006.01)

(52) U.S. Cl.
USPC .......... 429/481; 429/465; 429/469; 429/470; 429/484; 429/486; 429/489; 429/491; 429/508; 429/510; 429/532

(58) Field of Classification Search
USPC ......... 429/421, 465, 469–481, 484, 486, 489, 429/491, 508, 510, 532
See application file for complete search history.

(56) References Cited

U.S. PATENT DOCUMENTS

| | | |
|---|---|---|
| 6,794,075 B2 | 9/2004 | Steele et al. |
| 2002/0048699 A1 | 4/2002 | Steele et al. |
| 2004/0115503 A1 * | 6/2004 | Jacobson et al. ............... 429/34 |
| 2005/0191536 A1 | 9/2005 | Warrier et al. |
| 2007/0054169 A1 | 3/2007 | Day et al. |
| 2007/0072070 A1 * | 3/2007 | Quek et al. .................... 429/149 |

FOREIGN PATENT DOCUMENTS

| | | |
|---|---|---|
| JP | 2004-55194 A | 2/2004 |
| JP | 2004-512651 T | 4/2004 |
| JP | 2005-174664 A | 6/2005 |
| JP | 2006-253071 A | 9/2006 |
| WO | 03/092046 A1 | 11/2003 |
| WO | 2007/062117 A2 | 5/2007 |

OTHER PUBLICATIONS

JP2006-236989A, Machine English translation. These documents are newly cited in the Office Action dated Jan. 29, 2013 for the corresponding Japanese patent application.
JP2006-012453A, Machine English translation. These documents are newly cited in the Office Action dated Jan. 29, 2013 for the corresponding Japanese patent application.

* cited by examiner

*Primary Examiner* — Patrick Ryan
*Assistant Examiner* — Ben Lewis
(74) *Attorney, Agent, or Firm* — Edwards Wildman Palmer LLP

(57) ABSTRACT

A solid oxide fuel cell supplied with a fuel gas and an oxidant gas, including a single cell 4 having a plate-like electrolyte 41, an cathode 42 formed on an upper surface of the electrolyte 41, and a anode 43 formed on a lower surface of the electrolyte 41; a conductive support substrate 2 supporting the single cell 4, and having through-holes 21 that form a supply path for the fuel gas or oxidant gas; and a gas-permeable welding layer 3 sandwiched between the single cell 4 and the support substrate 2, and welded to the single cell 4 and the support substrate 2.

13 Claims, 12 Drawing Sheets

(a)

(b)

(c)

fig.16
(a)
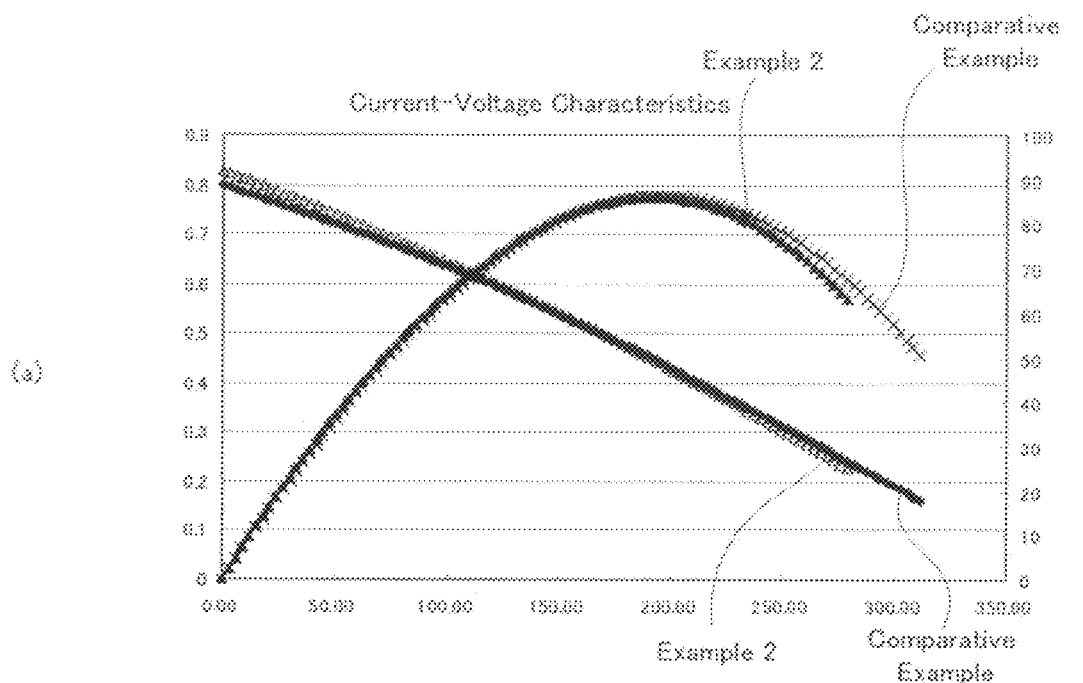
(b)
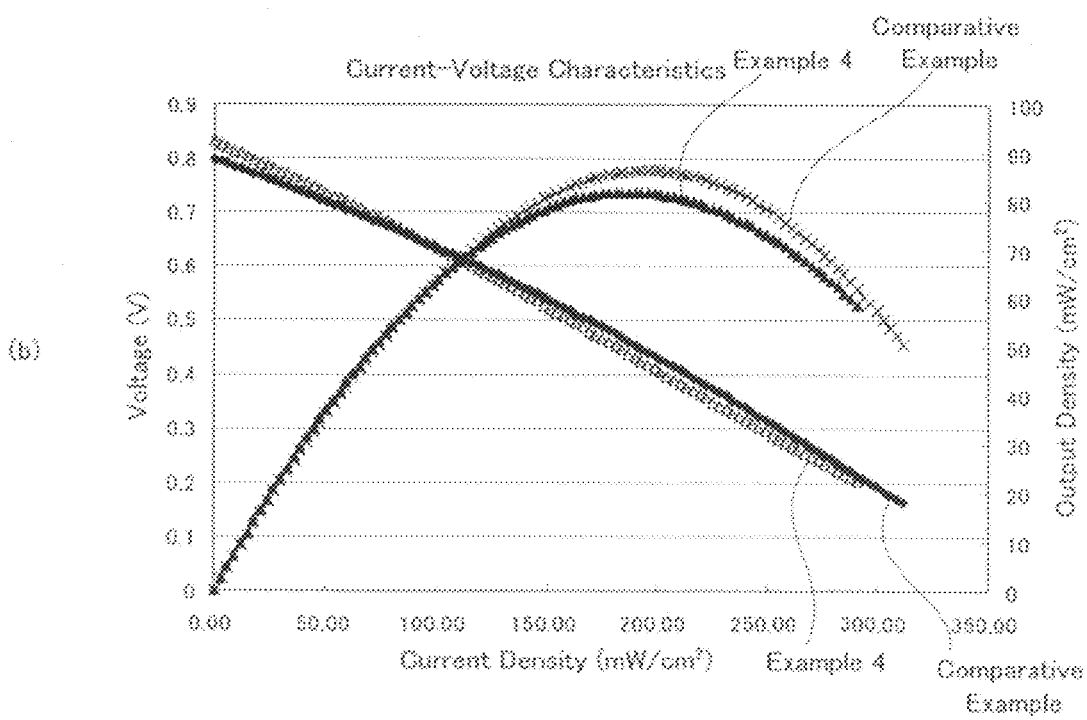

SOLID OXIDE FUEL CELL AND MANUFACTURING METHOD THEREOF

CROSS-REFERENCE TO RELATED APPLICATIONS

This application claims the benefit of foreign priority under 35 U.S.C. §119 based on Japanese applications 2007-253302, filed Sep. 28, 2007, and 2007-253316, filed Sep. 28, 2007, and the entire disclosures of the preceding applications are incorporated herein by reference.

BACKGROUND OF THE INVENTION (1) Field of the Invention

The present invention relates to solid oxide fuel cells and methods for manufacturing the solid oxide fuel cells.

(2) Description of the Related Art

Conventionally, solid oxide fuel cells (SOFCs) are classified into the following types: so-called electrolyte-supported cells, wherein a plate-like electrolyte is used as a support, and a anode is formed on one surface of the electrolyte, and an cathode is formed on the other surface of the electrolyte (for example, Japanese Unexamined Patent Publication No. 2004-055194); so-called electrode-supported cells, wherein one of the anode or cathode is used as a support, and the electrolyte and other electrode are formed in order on the support (for example, Japanese Unexamined Patent Publication No. 2006-253071); and the like.

However, these electrolyte-supported and electrode-supported fuel cells are susceptible to cracking because the electrolyte or the fuel or cathode used as a support is not strong enough. For this reason, so-called metal-supported cells are available, wherein a metal substrate is used as a support, and a anode, an electrolyte, and an cathode in paste form are applied to the metal substrate and sintered (for example, Japanese Unexamined Patent Publication No. 2005-174664).

However, because fuel cells of this type generate power by supplying gases separately to the anode and cathode, the electrolyte that defines the boundary between these electrodes must be dense so as to prevent the passage of the gases. Examples of methods for forming such dense films include a method wherein an electrolyte is applied by screen printing and sintered at a high temperature of about 1400° C. When an electrolyte is formed at such a high temperature, however, the support substrate that is typically made of a metal is subject to thermal damage such as oxidation, deformation, and the like. To overcome this problem, methods for forming films at low temperatures, such as CVD and the like, have been proposed, but these methods have suffered from low yields and high costs.

Accordingly, an object of the present invention is to provide solid oxide fuel cells that exhibit improved strength and are capable of preventing thermal damage.

SUMMARY OF THE INVENTION

In accordance with a first aspect of the invention, there is provided a solid oxide fuel cell supplied with a fuel gas and an oxidant gas, the solid oxide fuel cell including an electrolyte-supported or electrode-supported single cell having a anode, an electrolyte, and an cathode in this order; a conductive support substrate supporting the single cell, and having a supply path for the fuel gas or the oxidant gas; and a conductive welding layer with gas permeability, the welding layer being sandwiched between the single cell and the support substrate, and welded to the single cell and the support substrate.

With this structure, the mechanical strength of the cell can be improved by the single cell supporting the support substrate. Moreover, the gas-permeable welding layer is sandwiched between the single cell and the support substrate, and the welding layer is welded to the single cell and the support substrate. Thus, the single cell may be prepared first, and then the support substrate may be positioned on the single cell with the welding layer sandwiched therebetween. This prevents the support substrate from being subject to high temperatures required to make the electrolyte of the single cell dense, thereby preventing the support substrate from being subject to thermal damage. Consequently, materials that may be thermally damaged by exposure to high temperatures can also be used as the support substrate, thereby increasing the range of material options for the support substrate. The welding layer melts at such a melting point that the support substrate is not subject to thermal damage. The melting point depends on the material of the support substrate, but is preferably from about 800 to about 1,200° C.

In accordance with a second aspect of the invention, there is provided, in order to achieve the above-mentioned object, a solid oxide fuel cell supplied with a fuel gas and an oxidant gas, the solid oxide fuel cell including an electrolyte-supported or electrode-supported single cell having a anode, an electrolyte, and an cathode in this order; a pair of conductive support substrates sandwiching the single cell on a anode side and an cathode side, and having a supply path for the fuel gas or the oxidant gas; and conductive welding layers with gas permeability, each welding layer being sandwiched between the single cell and each support substrate, and welded to the single cell and the support substrate.

With this structure, in addition to the above-described effects, the following effect can be expected. Because the support substrate is sandwiched between the pair of support substrates, the impact resistance and mechanical performance of the cell can be improved; in particular, this structure will be effective against impact in the thickness direction of the cell can be improved.

The supply path for the fuel gas or oxidant gas may have various structures. For example, the support substrate may be porous, and the plurality of pores in the support substrate may form a supply path that allows the passage of gases therethrough. Moreover, the support substrate may have at least one through-hole, and the through-hole may form a supply path for supplying the fuel gas or oxidant gas therethrough.

In accordance with a third aspect of the invention, there is provided a solid oxide fuel cell including an electrolyte-supported or electrode-supported single cell having a anode, an electrolyte, and an cathode in this order; a support substrate supporting the single cell, and having at least one through-hole; a porous conductive collector, the collector filling the through-hole in the support substrate, and having a thickness equal to or greater than that of the support substrate; and a conductive welding layer with gas permeability, the welding layer being sandwiched between the single cell and the support substrate, and welded to the single cell and the support substrate.

With this structure, the mechanical strength of the cell can be improved by the support substrate supporting the single cell. Moreover, the gas-permeable welding layer is sandwiched between the single cell and the support substrate, and the welding layer is welded to the single cell and the support substrate. Thus, the single cell may be prepared first, and then the support substrate may be positioned on the single cell with the welding layer sandwiched therebetween. This prevents the support substrate from being subject to high temperatures required to make the electrolyte of the single cell dense, thereby preventing the support substrate from being subject to thermal damage. Consequently, materials that may be thermally damaged by exposure to high temperatures can also be used as the support substrate, thereby increasing the range of material options for the support substrate. Moreover, the support substrate has through-hole, which is filled with the porous conductive collector. This ensures the presence of a conductive path, even if the support substrate is not conductive. Consequently, the range of material options for the support substrate increases, enabling cost reductions by using inexpensive materials that may be insulating at the operating temperatures. The welding layer melts at such a melting point that the support substrate is not subject to thermal damage, or melts in an atmosphere gas. The melting point depends on the material of the support substrate, but is preferably from about 800 to about 1,200° C.

In accordance with a fourth aspect of the invention, there is provided a solid oxide fuel cell including an electrolyte-supported or electrode-supported single cell having a anode, an electrolyte, and an cathode in this order; a pair of conductive support substrates sandwiching the single cell on a anode side and an cathode side, and having at least one through-hole; a porous conductive collector, the collector filling the through-hole in each of the support substrates, and having a thickness equal to or greater than that of the support substrate; and conductive welding layers with gas permeability, each welding layer being sandwiched between the single cell and each support substrate, and welded to the single cell and the support substrate.

With this structure, in addition to the effects provided by the third aspect of the invention, the following effect can be obtained. Because the single cell is sandwiched between the pair of support substrates, the impact resistance and mechanical performance of the cell can be improved; in particular, the resistance against impact in the thickness direction of the cell can be improved.

In accordance with the first to fourth aspects of the invention, the welding layer may have various structures as long as it is gas-permeable. For example, the welding layer may have a predetermined pattern that communicates the single cell and the support substrate, or the welding layer may be a porous layer. The welding layer may also be made of a gas-permeable sheet material.

Each of the foregoing solid oxide fuel cells may have various structures; for example, the welding layer preferably includes silver or a compound containing silver.

The welding layer preferably has a melting point of 1,200° C. or less.

In accordance with a fifth aspect of the invention, there is provided, in order to achieve the above-mentioned object, a method for manufacturing a solid oxide fuel cell including the steps of preparing an electrolyte-supported or electrode-supported single cell having a anode, an electrolyte, and an cathode in this order; preparing a conductive support substrate for supporting the single cell; forming at least one through-hole in the support substrate; forming a conductive welding layer with gas permeability on the support substrate or the single cell; and laminating the support substrate and the single cell so that the welding layer is sandwiched therebetween, and melting the welding layer to thereby weld the melting layer to the support substrate and the single cell.

With this method, the mechanical strength of the cell can be improved by the single cell supporting the support substrate. Moreover, in this method, the support substrate and the single cell are first prepared separately, and then the gas-permeable welding layer is welded to the support substrate and the single cell so that the single cell is supported by the support substrate. In this way, the single cell and the support substrate are prepared separately. This prevents the support substrate from being subject to high temperatures required to make the electrolyte of the single cell dense, thereby preventing the support substrate from being subject to thermal damage. Consequently, materials that may be thermally damaged by exposure to high temperatures during the formation of an electrolyte can also be used as the support substrate, thereby increasing the range of material options for the support substrate. Furthermore, costs can be reduced because a technique for forming films at low temperatures having a low yield or high costs is not used. The welding layer melts at such a melting temperature that the support substrate is not subject to thermal damage. The melting point depends on the material of the support substrate, but is preferably from about 800 to about 1,200° C.

In accordance with a sixth aspect of the invention, there is provided, in order to achieve the above-mentioned object, a method for manufacturing a solid oxide fuel cell including the steps of preparing an electrolyte-supported or electrode-supported single cell having a anode, an electrolyte, and an cathode in this order; preparing a support substrate for supporting the single cell; forming at least one through-hole in the support substrate; forming a conductive welding layer with gas permeability on the support substrate or the single cell; laminating the support substrate and the single cell so that the welding layer is sandwiched therebetween, and melting the welding layer to thereby weld the melting layer to the support substrate and the single cell; and forming a porous collector so as to fill the through-hole in the support substrate.

With this method, the mechanical strength of the cell can be improved by the single cell supporting the support substrate. Moreover, in this method, the support substrate and the single cell are first prepared separately, and then the welding layer is welded to the single cell and the support substrate so that the single cell is supported by the support substrate. In this way, the single cell and the support substrate are prepared separately. This prevents the support substrate from being subject to high temperatures required to make the electrolyte of the single cell dense, thereby preventing the support substrate from being subject to thermal damage. Consequently, materials that may be thermally damaged by exposure to high temperatures during the formation of an electrolyte can also be used as the support substrate, thereby increasing the range of material options for the support substrate. Furthermore, in this method, the collector is formed by filling the through-hole in the support substrate with a collector paste, and sintering the paste. This ensures the presence of a conductive path, even if the support substrate itself is not conductive. Therefore, the range of material options for the support substrate increases, enabling cost reductions by using inexpensive materials that may be insulating at the operating temperatures. The welding layer melts at such a melting point that the support substrate is not subject to thermal damage. The melting point depends on the material of the support substrate, but is preferably from about 800 to about 1,200° C.

In accordance with a seventh aspect of the invention, there is provided, in order to achieve the above-mentioned object, a method for manufacturing a solid oxide fuel cell including the steps of preparing an electrolyte-supported or electrode-supported single cell having a anode, an electrolyte, and an cathode in this order; preparing a conductive and porous support substrate for supporting the single cell; forming a conductive welding layer with gas permeability on the support substrate or the single cell; and laminating the support substrate and the single cell so that the welding layer is sandwiched therebetween, and melting the welding layer to thereby weld the melting layer to the support substrate and the single cell.

With this method, the mechanical strength of the cell can be improved by the single cell supporting the support substrate. Moreover, in this method, the support substrate and the single cell are first prepared separately, and then the welding layer is welded to the single cell and the support substrate so that the single cell is supported by the support substrate. In this way, the single cell and the support substrate are prepared separately. This prevents the support substrate from being subject to high temperatures required to make the electrolyte of the single cell dense, thereby preventing the support substrate from being subject to thermal damage. Consequently, materials that may be thermally damaged by exposure to high temperatures during the formation of an electrolyte can also be used as the support substrate, thereby increasing the range of material options for the support substrate. The welding layer melts at such a melting point that the support substrate is not subject to thermal damage. The melting point depends on the material of the support substrate, but is preferably from about 800 to about 1,200° C.

In accordance with the fifth to seventh aspects of the invention, the conductive welding layer with gas permeability may be formed on at least one of the support substrate and the single cell. That is to say, the welding layer may be formed on either the support substrate or the single cell, or on each of the support substrate and the single cell. In the subsequent step, the support substrate and the single cell may be laminated so that the welding layer or layers are sandwiched therebetween. When the welding layer is formed on each of the support substrate and the single cell, the adhesion between the support substrate and the single cell increases to improve the mechanical strength. The welding layer may have various structures as long as it is gas-permeable. For example, the welding layer may have a predetermined pattern that communicates the single cell and the support substrate, or may be a porous layer. The welding layer may also be made of a gas-permeable sheet material. When a sheet material is used, the sheet material may be positioned on at least one of the support substrate and the single cell, and may then be fused between the support substrate and the single cell.

In accordance with an eighth aspect of the invention, there is provided, in order to achieve the above-mentioned object, a method for manufacturing a solid oxide fuel cell including the steps of preparing an electrolyte-supported or electrode-supported single cell having a anode, an electrolyte, and an cathode in this order; preparing two conductive support substrates for supporting the single cell; forming at least one through-hole in each of the support substrates; forming conductive welding layers with gas permeability, each welding layer being formed between each of the support substrates and the single cell; and laminating the two support substrates and the single cell so that the support substrates sandwich the single cell, and each welding layer is sandwiched between each support substrate and the single cell, and melting the welding layers to thereby weld the welding layers to the respective support substrates and the single cell.

In accordance with a ninth aspect of the invention, there is provided, in order to achieve the above-mentioned object, a method for manufacturing a solid oxide fuel cell including the steps of preparing an electrolyte-supported or electrode-supported single cell having a anode, an electrolyte, and an cathode in this order; preparing two support substrates for supporting the single cell; forming at least one through-hole in each of the support substrates; forming conductive welding layers with gas permeability, each welding layer being formed between each of the support substrates and the single cell; laminating the two support substrates and the single cell so that the support substrates sandwich the single cell, and each welding layer is sandwiched between each support substrate and the single cell, and melting the welding layers to thereby weld the welding layers to the respective support substrates and the single cell; and forming a porous collector so as to fill the through-hole in the support substrate.

In accordance with a tenth aspect of the invention, there is provided, in order to achieve the above-mentioned object, a method for manufacturing a solid oxide fuel cell including the steps of preparing an electrolyte-supported or electrode-supported single cell having a anode, an electrolyte, and an cathode in this order; preparing two conductive and porous support substrates for supporting the single cell; forming conductive welding layers with gas permeability, each welding layer being formed between each of the support substrates and the single cell; and laminating the two support substrates and the single cell so that the support substrates sandwich the single cell, and each welding layer is sandwiched between each support substrate and the single cell, and melting the welding layers to thereby weld the welding layers to the respective support substrates and the single cell.

In accordance with the eighth to tenth aspects of the invention, in addition to the same effects as those provided by the fifth to seventh aspects of the invention, the following effect can be obtained. Because the single cell is sandwiched between the pair of support substrates, the impact resistance and mechanical performance of the cell can be improved; in particular, resistance against impact in the thickness direction of the cell can be improved.

Furthermore, in the eighth to tenth aspects of the invention, the step of forming welding layers may include forming a welding layer on at least one of opposing surfaces of each support substrate and the single cell. When welding layers are formed on both of each support substrate and the single cell, the adhesion upon lamination increases to improve the mechanical strength. The welding layer may have various structures as long as they are gas-permeable. For example, the welding layer may have a predetermined pattern that communicates the single cell and the support substrate, or may be a porous layer. The welding layer may also be made of a gas-permeable sheet material. When a sheet material is used, the sheet material may be positioned on at least one of the support substrate and the single cell, and may then be fused between the support substrate and the single cell.

The welding layer used in each of the foregoing methods may include silver or a compound containing silver.

The welding layer used in each of the foregoing methods may have a melting point of 1,200° C. or less.

In accordance with the invention, solid oxide fuel cells that exhibit improved strength and are capable of preventing thermal damage can be provided.

BRIEF DESCRIPTION OF THE DRAWINGS

FIGS. 16(a) and (b) are graphs comparing the voltage-current characteristics of the cells according to Examples 2 or 4 and the Comparative Example.

EXPLANATION OF THE REFERENCE NUMERALS

Figure 1:
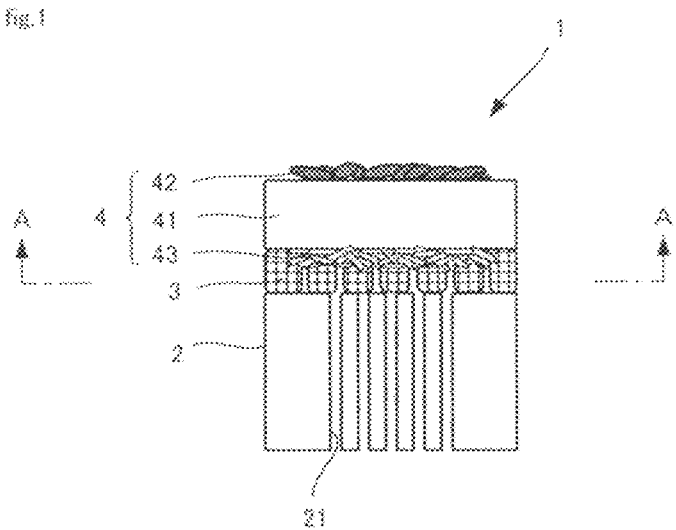
FIG. 1 is a front cross-sectional view showing an embodiment of the solid oxide fuel cell of the invention.

1 Solid oxide fuel cell
2 Support substrate
21 Through-hole
3 Welding layer
4 Single cell
41 Electrolyte
42 Cathode
43 Anode
5 Collector

DESCRIPTION OF THE PREFERRED EMBODIMENTS

Embodiments of the solid oxide fuel cells according to the present invention are described with reference to the drawings. FIG. 1 is a front cross-sectional view showing a solid oxide fuel cell according to an embodiment, and FIGS. 2(a), (b), and (c) are cross-sectional views taken along line A-A of FIG. 1.

As shown in FIG. 1, the solid oxide fuel cell 1 includes a support substrate 2, a welding layer 3, and a single cell 4 in this order. The support substrate 2, welding layer 3, and single cell 4 are integrated by welding of the welding layer 3 to the support substrate 2 and single cell 4. The single cell 4 has a plate-like electrolyte 41 that is rectangular from a plan view, and has, on an upper surface of the electrolyte 41, a thin-film cathode 42 that is rectangular from a plan view and is smaller than the electrolyte 41. A thin-film anode 43 that is rectangular from a plan view and is smaller than the electrolyte 41 is also formed on a lower surface of the electrolyte 41. The single cell 4 is thus a so-called electrolyte-supported cell using the electrolyte 41 as a support. The support substrate 2 is conductive, and has a plurality of through-holes 21. The anode 43 and cathode 42 are porous and gas-permeable. On the other hand, the support substrate 2, welding layer 3, and electrolyte 41 are dense and gas-impermeable; however, the support substrate 2 and welding layer 3 may also be porous.

Figure 2:
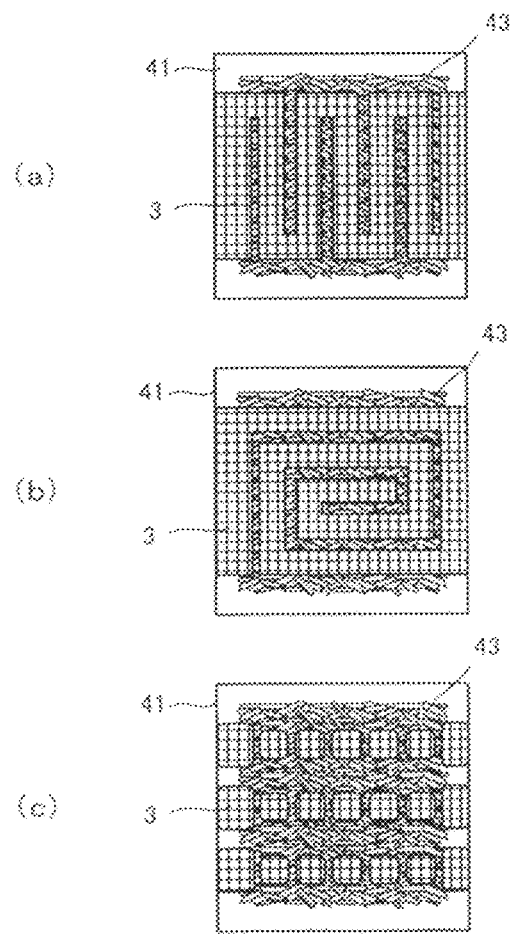
FIG. 2 are cross-sectional views taken along line A-A of FIG. 1.

As shown in FIG. 2, the welding layer 3 is welded on the anode 43 of the single cell 4. The welding layer is patterned, and may have various shapes such as, for example, a zigzag shape (FIG. 2(a)), a spiral shape (FIG. 2(b)), and a dot-like shape (FIG. 2(c)).

Materials forming the above-described fuel cell are next explained. The support substrate 2 may be made of a dense material, and may be made of a metal or metal oxide. Examples of usable metal materials include Fe, Ti, Cr, Cu, Ni, and Ag. These metals may be used alone, or two or more of them may be used as an alloy. For example, stainless heat-resistant materials can be used, and more specifically, austenitic stainless steels and ferritic stainless steels can be used. The support substrate 2 preferably has a thickness of 50 to 5,000 μm.

Examples of materials for the welding layer 3 include silver, gold, platinum, copper, compounds containing these metals, and the like. The porous welding layer 3 preferably has a porosity of 20 to 80% when it is welded to the support substrate 2 and the single cell 4, so as to provide good gas impermeability and strength. The welding layer 3 preferably has a thickness of 1 to 200 μm upon melting and welding to the support substrate 2 and single cell 4. The welding layer 3 preferably has such a melting point that does not thermally damage the support substrate 2, and more specifically, a melting point of 1,200° C. or less.

Known electrolytes for solid oxide fuel cells are usable as the material of the electrolyte 41. Examples of usable materials include oxygen-ion conducting ceramic materials such as ceria-based oxides doped with samarium, gadolinium, and the like; lanthanum gallate doped with strontium and magnesium; and zirconia-based oxides containing scandium and yttrium. The electrolyte 41 preferably has a thickness of 200 to 1,000 μm when used as a support.

The anode 43 or cathode 42 may be formed from a ceramic powder material. The powder preferably has a mean particle size of 10 nm to 100 μm, more preferably 50 nm to 50 μm, and still more preferably 100 nm to 10 μm. The mean particle size can be determined according to, for example, JIS Z8901.

The anode 43 may be formed using, for example, a mixture of a metal catalyst and a ceramic powder material made of an oxide-ion conductor. Examples of materials usable as the metal catalyst include nickel, iron, cobalt, precious metals (platinum, ruthenium, palladium, and the like), and the like, which are stable in a reducing atmosphere, and have hydrogen oxidation activity. An oxide-ion conductor with the fluorite or perovskite structure is preferably used as the oxide-ion conductor. Examples of oxide-ion conductors with the fluorite structure include ceria-based oxides doped with samarium, gadolinium, and the like, and zirconia-based oxides containing scandium and yttrium. Examples of oxide-ion conductors with the perovskite structure include lanthanum gallate doped with strontium and magnesium. Among these materials, a mixture of an oxide-ion conductor and nickel is preferably used to form the anode 43. The mixture of a ceramic material made of an oxide-ion conductor and nickel may be in the form of a physical mixture, or in the form of nickel modified with a powder or a ceramic material modified with nickel. The above-mentioned ceramic materials can be used alone, or two or more of them can be used as a mixture. The anode 43 may also be formed using a metal catalyst alone.

Examples of ceramic powder materials that can be used to form the cathode 42 include metal oxides made of Co, Fe, Ni, Cr, Mn, and the like with the perovskite or a like structure. More specifically, oxides such as $(Sm, Sr)CoO_3$, $(La,$ Sr)MnO$_3$, (La, Sr)CoO$_3$, (La, Sr)(Fe, Co)O$_3$, (La, Sr)(Fe, Co, Ni)O$_3$, and the like are usable, with (La, Sr)(Fe, Co)O$_3$ being preferred. These ceramic materials can be used alone, or two or more of them can be used as a mixture.

The anode 43 and cathode 42 can be formed by, for example, a wet coating or dry coating method. Examples of wet coating methods include screen printing, electrophoretic deposition (EPD), doctor blade, spray coating, ink jet, spin coating, dip coating, and the like. In this case, components forming the anode 43 or cathode 42 should be made into a paste; the above-mentioned material is used as a main component, and suitable amounts of a binder resin, an organic solvent, and the like are further added thereto. More specifically, the binder resin and the like are preferably added so that the proportion of the main component is 50 to 95% by weight in the mixture of the main component and the binder resin. Examples of dry coating methods include evaporation, sputtering, ion-plating, chemical vapor deposition (CVD), electrochemical vapor deposition, ion-beam, laser ablation, plasma deposition at atmospheric pressure, vacuum plasma deposition, and the like. The anode 43 and cathode 42 have a film thickness of 5 to 100 μm, and preferably 5 to 50 μm.

Figure 3:
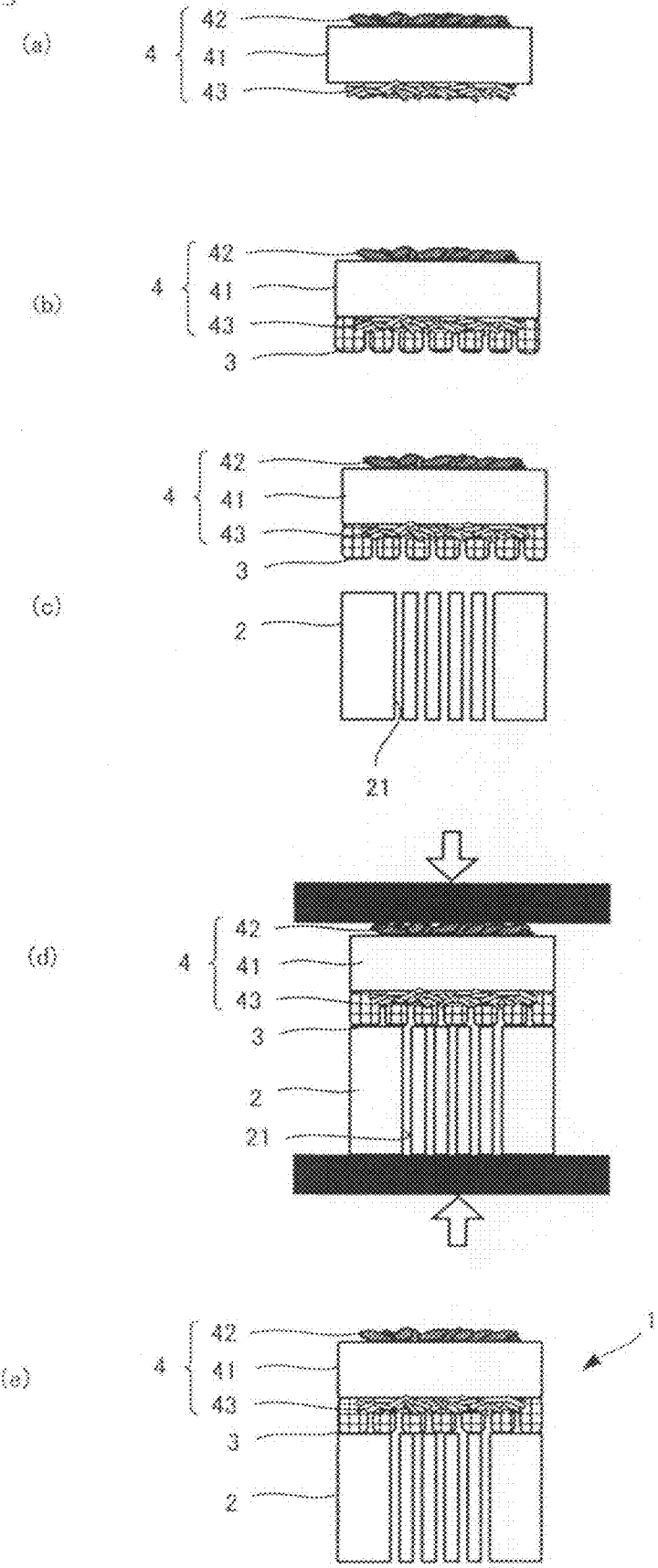
FIGS. 3($a$) to ($e$) are a flowchart showing a method for manufacturing a solid oxide fuel cell according to an embodiment.

A method for manufacturing a solid oxide fuel cell with the above-described structure is next described with reference to the drawings. FIGS. 3(*a*) to (*e*) show a method for manufacturing a solid oxide fuel cell according to an embodiment.

A single cell 4 is prepared first (FIG. 3(*a*)). The single cell 4 can be fabricated using, for example, a known method as follows.

A substrate for the electrolyte 41 made of the above-mentioned material is prepared from a powder by press-molding and sintering. A anode paste made of the above-mentioned material is applied to a lower surface of the electrolyte 41 by screen printing, and the applied paste is dried and sintered for a predetermined time to form a porous anode 43. An cathode paste made of the above-mentioned material is then applied to an upper surface of the electrolyte 41 by screen printing, and the applied paste is dried and sintered for a predetermined time to form a porous cathode 42. The single cell 4 is thus prepared.

A welding layer 3 is next patterned on a lower surface of the single cell 4 (FIG. 3(*b*)). More specifically, a welding layer paste prepared by making a welding layer material into a paste is applied to the anode by screen printing, so as to form a predetermined pattern on the lower surface of the single cell 4, and the applied paste is dried and sintered for a predetermined time. At this time, a welding layer may also be formed on the support substrate 2 by applying a welding layer paste under the same conditions as above.

After this, the support substrate 2 with through-holes 21 is positioned underneath the single cell 4 having the welding layer 3 thereon (FIG. 3(*c*)). At this time, when a welding layer 3 is also formed on the support substrate 2, the support substrate 2 is positioned underneath the single cell 4 so that the welding layer on the anode 43 and the welding layer on the support substrate 2 come into contact with each other. The through-holes 21 can be formed in the support substrate 2 by several methods; for example, by applying a suitable mask over a lower surface of the support substrate 2, following by etching.

The lamination of the support substrate 2 and single cell 4 in this order is subsequently heated to such a high temperature that is near the melting point of the welding layer 3, but that does not thermally damage the support substrate 2, while pressure is applied to an upper surface of the single cell 4 and the lower surface of the support substrate 2 (FIG. 3(*d*)). The heating temperature depends on the material of the welding layer 3; when the welding layer 3 is made of silver, heating is preferably performed for 1 to 10 hours at a temperature of 800 to 1,000° C. The pressure is preferably from 100 to 10,000 g/cm$^2$. Through the above-described steps, the welding layer 3 is melted and welded to the support substrate 2 and the single cell 4, resulting in a solid oxide fuel cell 1 (FIG. 3(*e*)).

The fuel cell with the above-described structure generates power as follows. First, the fuel cell is divided into the anode 43 side and the cathode 42 side using gaskets (not illustrated) or the like, with the electrolyte 41 defining the boundary. An oxidant gas such as air is then supplied to the cathode 42. At the same time, a fuel gas composed of hydrogen, or a hydrocarbon such as methane, ethane, or the like is introduced via the through-holes 21 in the support substrate 2. A fuel gas introduced via the through-holes 21 in the support substrate 2 contacts the anode 43. Since the welding layer 3 is patterned, it does not fill the entire space between the single cell 4 and the support substrate 2, resulting in gap portions where the welding layer 3 is not formed. Thus, even though the welding layer 3 itself is dense, the fuel gas introduced via the through-holes 21 passes through the gap portions not having the welding layer 3, and contacts the anode 43 of the single cell 4. In this way, the anode 43 and the cathode 42 contact the fuel gas and the oxidant gas, respectively, to cause oxygen-ion conduction between the anode 43 and cathode 42 via the electrolyte 41, thereby generating power.

As described above, in the foregoing embodiments, because the single cell 4 is supported by the support substrate 2, the mechanical strength of the fuel cell 1 can be improved. Moreover, the single cell 4 is prepared first, and then the single cell 4 and support substrate 2 are integrated via the welding layer 3. This prevents the support substrate from being subject to high temperatures required to make the electrolyte of the single cell dense, thereby preventing the support substrate 2 from being subject to thermal damage. Consequently, materials that may be thermally damaged by exposure to high temperatures can also be used as the support substrate 2, thereby increasing the range of material options for the support substrate 2.

Figure 4:
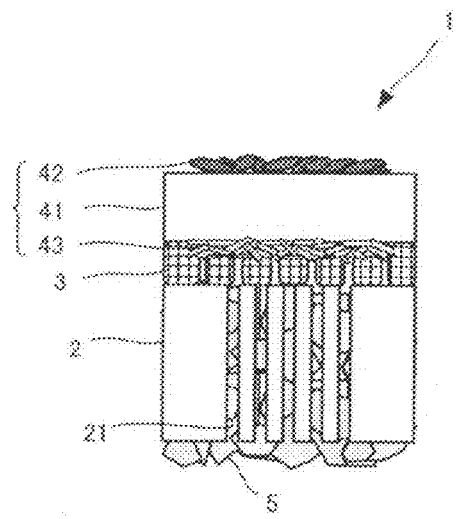
FIG. 4 is a front cross-sectional view showing another embodiment of the solid oxide fuel cell of the invention.

While embodiments of the present invention have been described above, the invention is not limited by these embodiments, and various modifications can be made without departing from the scope of the invention. For example, as shown in FIG. 4, the through-holes 21 in the support substrate 2 may be filled with a porous collector 5, and the support substrate 2 may be covered with the collector to the lower surface thereof. That is to say, the collector 5 may be thicker than the support substrate 2. Conductive metals such as Fe, Ti, Cr, Cu, Ni, Ag, Au, Pt, and the like are usable as the collector 5; these metals may be used alone, or two or more of them may be used as a mixture.

Such a solid oxide fuel cell 1 may be manufactured by forming the collector 5 in the through-holes 21 by screen printing or the like after performing the manufacturing process described in the foregoing embodiment (FIG. 3). More specifically, the collector 5 is prepared by using the above-mentioned material as a main component, and adding a binder resin, an organic solvent, and the like thereto; more specifically, the binder resin and the like are added so that the proportion of the main component is 50 to 90% by weight in the mixture of the main component and the binder resin. A paste for the collector is thus formed using these materials. A heat-decomposable resin such as a blowing agent or the like can be incorporated into the collector paste, so that, upon sintering the paste after printing, the heat-decomposable resin is decomposed and removed. This results in multiple pores being formed in the collector 5, making the collector porous.

As described above, when the through-holes 21 in the support substrate 2 are filled with the collector 5, the collector 5 ensures a conductive path, even if the support substrate 2 itself is not conductive. Consequently, the range of material options for the support substrate 2 increases, enabling cost reductions by using inexpensive materials that may be insulating at the operating temperatures.

Figure 5:
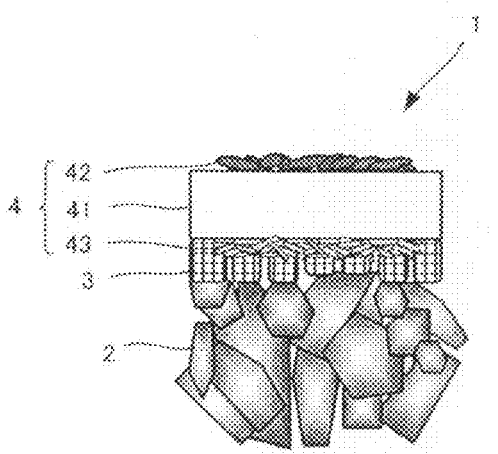
FIG. 5 is a front cross-sectional view showing still another embodiment of the solid oxide fuel cell of the invention.

Various other modifications are possible; for example, as shown in FIG. 5, when the support substrate 2 is conductive, and is also porous to ensure gas permeability, the provision of the through-holes 21 may be omitted. In this case, a gas passes through the plurality of pores in the support substrate 2. The support substrate 2 preferably has a porosity of 20 to 60% to achieve good gas permeability and strength. In consideration of such requirements, conductive metals such as Fe, Ti, Cr, Cu, Ni, Ag, Au, Pt, and the like are usable as the material forming the support substrate 2; these metals may be used alone, or two or more of them may be mixed. For example, stainless heat-resistant materials can be used; more specifically, austenitic stainless steels, ferritic stainless steels, heat-resistant nickel-based alloys such as Inconel (registered trademark), Hastelloy (registered trademark), and the like can be used. The term "porous" as used herein means that the pores communicate with one another. The support substrate 2 preferably has a thickness of 50 to 5,000 μm.

In the foregoing embodiments, the welding layer 3 is formed on the lower surface of the single cell 4; however, the welding layer 3 may also be formed, for example, on the support substrate 2.

In the foregoing embodiments, the so-called electrolyte-supported single cell 4 using the electrolyte 41 as a support is used; however, the single cell 4 may also be an electrode-supported cell using the anode 43 or cathode 42 as a support.

In the foregoing embodiments, the solid oxide fuel cell 1 has been described as a two-chamber fuel cell; however, the solid oxide fuel cell 1 may also be operated as a single-chamber fuel cell supplied with a gas mixture of a fuel gas and an oxidant gas.

Figure 6:
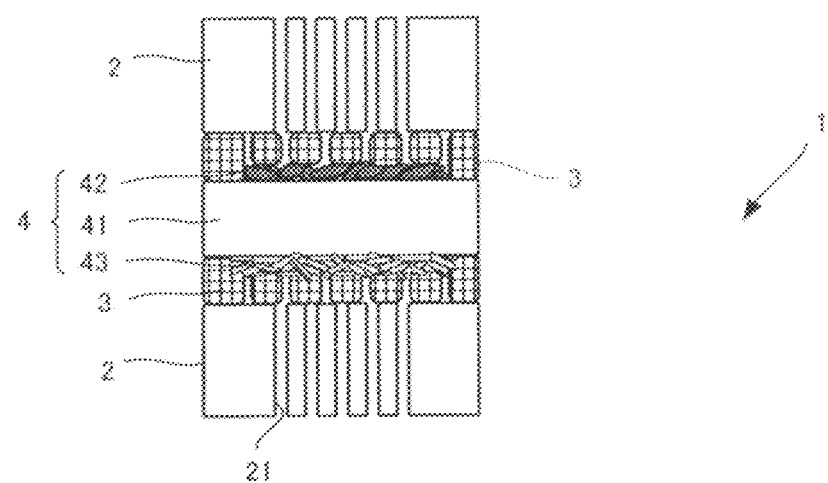
FIG. 6 is a front cross-sectional view showing still another embodiment of the solid oxide fuel cell of the invention.
Figure 7:
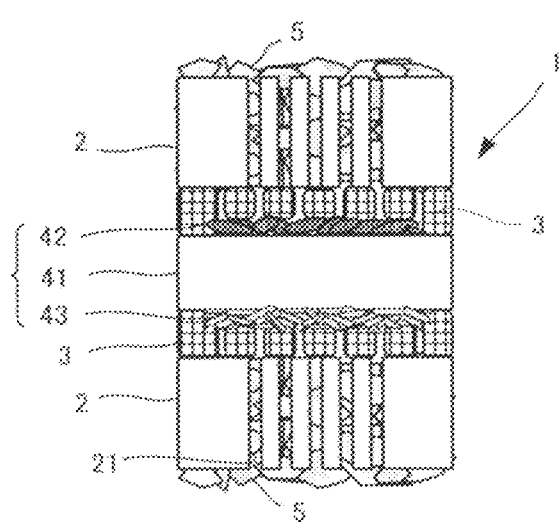
FIG. 7 is a front cross-sectional view showing still another embodiment of the solid oxide fuel cell of the invention.

Furthermore, as shown in FIG. 6, two support substrates 2 may be prepared, and a fuel cell 1 wherein the single cell 4 is sandwiched between the two support substrates 2 may be fabricated. As shown in FIG. 7, when the support substrates 2 have through-holes 21, the through-holes 21 in each substrate 2 may be filled with a collector 5. The materials for the support substrates and the like used are the same as mentioned in the foregoing embodiments. When a single cell is sandwiched between two support substrates, the mechanical strength of the cell is further improved; in particular, the impact strength in the thickness direction is improved.

Instead of having various patterns to ensure the passage of a gas, as described above, the welding layer 3 may also be a porous welding layer 3 formed by changing the amount of a binder, or adding a pore-forming agent when making a welding layer paste. That is to say, such a porous welding layer can be formed on the entire surface of the support substrate 2. This enables the passage of a gas.

Because the welding layer 3 is patterned, it does not fill the entire space between the single cell 4 and the support substrate 2, resulting in gap portions where the welding layer 3 is not formed. Thus, even though the welding layer 3 itself is dense, the fuel gas introduced via the through-holes 21 passes through the gap portions not having the welding layer 3, and contacts the anode 43 of the single cell 4.

In the foregoing embodiments, the cathode 42 is formed on the upper surface of the electrolyte 41, and the anode 43 is formed on the lower surface of the electrolyte 41; however, this arrangement may be reversed, i.e., the anode may be formed on the upper surface of the electrolyte 41, and the cathode may be formed on the lower surface of the electrolyte 41.

A welding layer can also be formed using a porous sheet material, instead of using the above-described printing or the like. While the material of the welding layer is the same as mentioned above, the thickness of the welding layer after welding may, for example, be from 50 μm to 1 mm. A method for making the welding layer is as follows.

Figure 8:
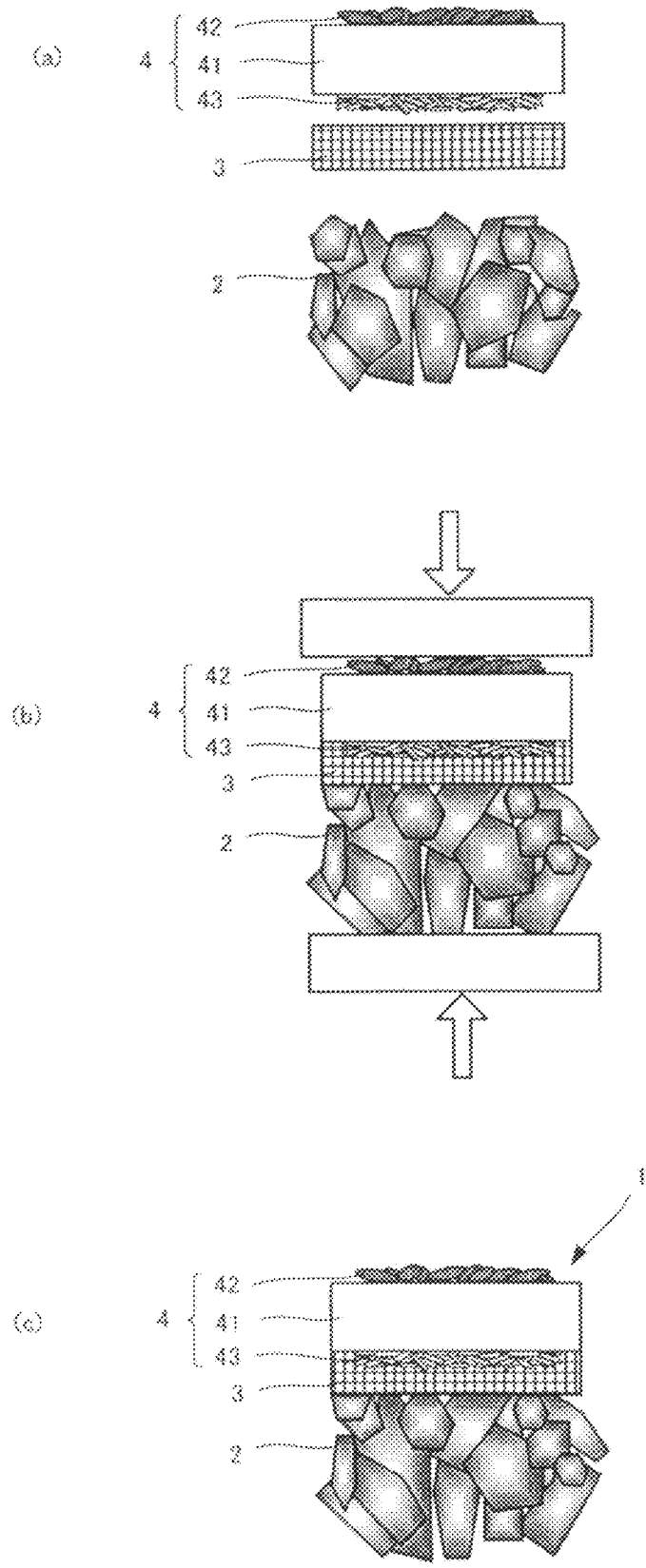
FIGS. 8(a), (b), and (c) are a flowchart showing another method for manufacturing a solid oxide fuel cell of the invention.

A single cell 4 and a support substrate 2 are prepared first, and a welding sheet 3 is sandwiched therebetween (FIG. 8(a)). The support substrate is the same porous substrate as shown in FIG. 5. The method for preparing the single cell 4 is as described above. Then, the lamination of the single cell 4, welding sheet 3, and support substrate 2 in order from above is heated to such a temperature that is near the melting point of the welding sheet 3, but that does not thermally damage the support substrate 2, while pressure is applied to an upper surface of the single cell 4 and the lower surface of the support substrate 2 (FIG. 8(b)). The heating temperature depends on the material of the welding sheet 3; when the welding sheet 3 is made of silver, heating is preferably performed for 1 to 10 hours at a temperature of 800 to 1,000° C. The pressure is preferably from 100 to 10,000 g/cm². Through the above-described steps, the welding sheet 3 is melted and welded to the support substrate 2 and the single cell 4, resulting in a solid oxide fuel cell (FIG. 8 (c)).

Figure 9:
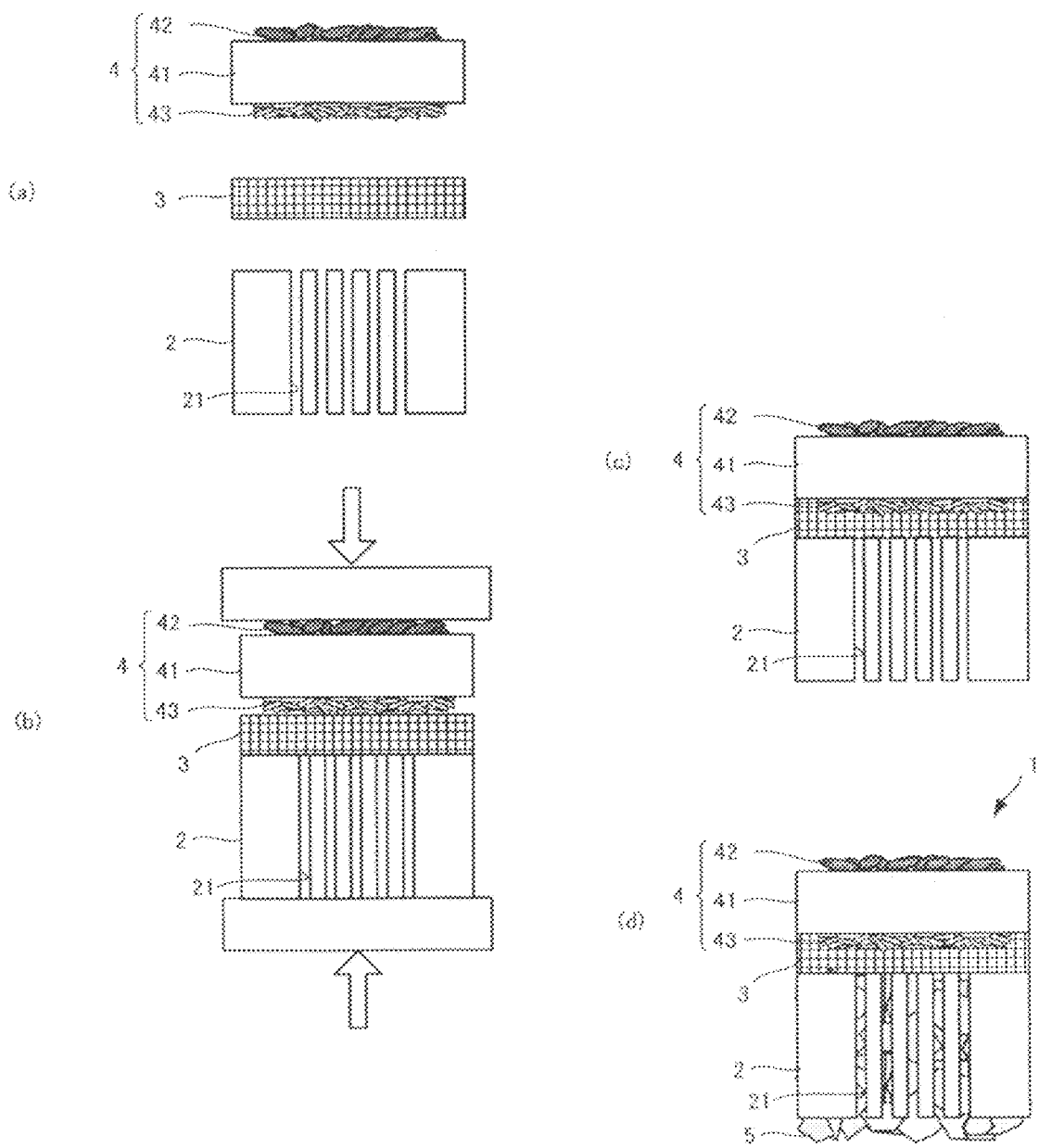
FIGS. 9(a) to (d) are a flowchart showing another method for manufacturing a solid oxide fuel cell of the invention.

Moreover, as shown in FIG. 4, the support substrate may have through-holes, and these through-holes may be filled with a collector. The method for making such a cell is as shown in FIG. 9. First, a plurality of through-holes 21 are formed through a lower surface of the support substrate 2. A single cell 4 is then prepared by a known method, and the single cell 4, welding sheet 3, and support substrate 2 are laminated in this order (FIG. 9(a)). This lamination is subsequently heated to such a temperature that is higher than the melting point of the welding sheet 3, but does not thermally damage the support substrate 2, while pressure is applied to an upper surface of the single cell 4 and the lower surface of the support substrate 2 (FIG. 9 (b)). The heating temperature depends on the material of the welding sheet 3; when the welding sheet 3 is made of silver, heating is preferably performed for 1 to 10 hours at a temperature of 800 to 1,000° C. The pressure is preferably from 100 to 10,000 g/cm². This causes the welding sheet 3 to be melted and thereby welded to the support substrate 2 and single cell 4, resulting in an integral structure (FIG. 9(c)).

Lastly, the lower surface of the support substrate 2 is covered with a collector 5 so that the through-holes are embedded therein. The collector 5 can be formed by screen printing or the like. A collector paste is formed using the above-mentioned material. A heat-decomposable resin such as a blowing agent or the like can be incorporated into the collector paste, so that, upon sintering the paste after printing, the heat-decomposable resin is decomposed and removed. This results in multiple pores being formed in the collector 5, making the collector porous. As an alternative, pores can be formed by adjusting the sintering step. Through the above-described steps, a solid oxide fuel cell 1 is accomplished (FIG. 9(d)).

Figure 10:
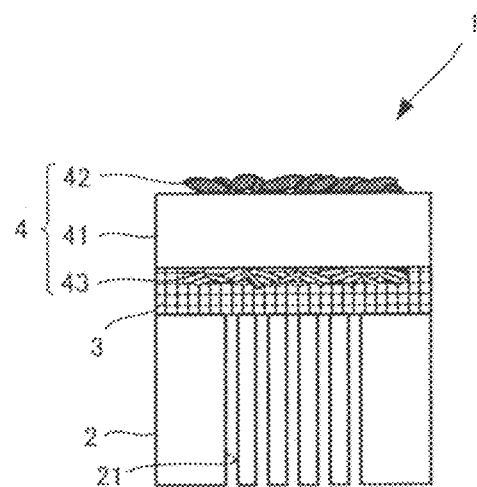
FIG. 10 is a front cross-sectional view showing another embodiment of the solid oxide fuel cell of the invention.

In the example shown in FIG. 8, a means for supplying a fuel gas or an oxidant gas is provided by making the support substrate 2 porous; however, as shown in FIG. 10, when the support substrate is conductive even in the atmosphere during power generation, a means for supplying a fuel gas or an oxidant gas can be provided by making the support substrate dense and forming a plurality of through-holes in the support substrate.

Figure 11:
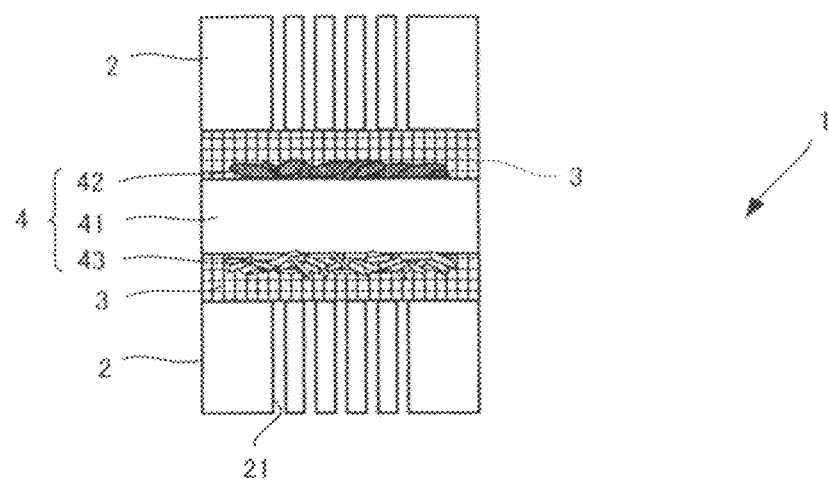
FIG. 11 is a front cross-sectional view showing another embodiment of the solid oxide fuel cell of the invention.
Figure 12:
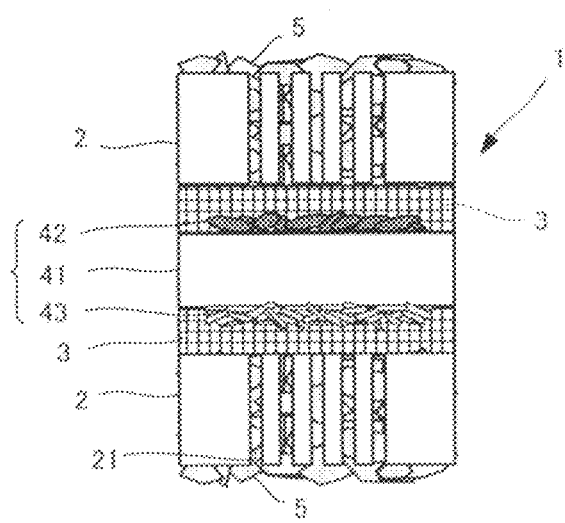
FIG. 12 is a front cross-sectional view showing another embodiment of the solid oxide fuel cell of the invention.

When the welding layers are made of a sheet material, they can be sandwiched between two substrates, as shown in FIGS. 6 and 7. Examples of this structure are shown in FIGS. 11 and 12. FIG. 11 shows an example using a solid oxide fuel cell prepared according to the manufacturing method shown in FIG. 8; and FIG. 12 shows an example using a solid oxide fuel cell prepared according to the manufacturing method shown in FIG. 9.

EXAMPLES

Examples of the present invention are described below; however, the invention is not limited by the following Examples. In the following description, cells with the same structures as shown in FIGS. 1, 4, 9, and 8 were fabricated as the cells according to Examples 1, 2, 3, and 4, respectively. As a comparative example, an electrolyte-supported cell not using a support substrate was also fabricated. Since the same materials are used for each type of cell, the materials are described first.

(1) Preparation of the Materials
Electrolyte Substrate

A GDC (Ce:Gd:O=0.9:0.1:1.9) powder (particle size range: 0.1 to 3 μm; mean particle size: 1 μm) was placed in a pressure-resistant container and compacted using a uniaxial press at a pressure of 1 t/cm$^2$. The resulting compacted powder was packed with a vacuum packing and compacted again using an isostatic press at a pressure of 1 t/cm$^2$. The resulting compact was subsequently sintered (for 10 hours at 1,450° C.) to prepare an electrolyte substrate. The mean particle size can be measured according to JIS Z8901.

Anode Paste

NiO powder (mean particle size: 1 μm) and GDC (Ce:Gd:O=0.9:0.1:1.9) were added to ethyl carbitol, and ethyl cellulose was added as a binder to the mixture so that the mass ratio would be 80:20. These components were mixed using a roll to prepare a anode paste (viscosity: $5.0 \times 10^5$ mPa·s) for forming a anode.

Cathode Paste (La, Sr)(Fe, CO)O$_3$ powder (mean particle size: 0.52 μm) was added to ethyl carbitol, and ethyl cellulose was added as a binder to the mixture so that the mass ratio would be 85:15. These components were mixed using a roll to prepare an cathode paste (viscosity: $5.0 \times 10^5$ mPa·s) for forming an cathode.

Support Substrate

A 0.2-mm-thick sheet of ZMG232L (manufactured by Hitachi Metals, Ltd.) was used as the support substrate, and through-holes with a hole diameter of 0.2 mm and a hole interval of 0.2 mm were formed in the support substrate by etching using ferric chloride.

Welding Sheet

The welding sheet was made of silver and had meshes with an opening size of 0.1 mm and a wire size of 0.05 mm. The thickness of the welding sheet was 0.1 mm.

(2) Manufacturing of the Cell According to Example 1

The anode paste was applied to one surface of the electrolyte substrate to a film thickness of about 40 μm by screen printing, and dried for 15 minutes at 130° C. The dried film was then sintered for 1 hour at 1,450° C. to form a anode. The cathode paste was subsequently applied to the other surface of the electrolyte to a film thickness of about 40 μm by screen printing and dried for 15 minutes at 130° C. The dried film was then sintered for 1 hour at 1,200° C. to prepare a single cell. Subsequently, a silver paste was applied to one surface of each of the single cell and the support substrate by screen printing to form a grid pattern (opening size: 1 mm, line width: 0.5 mm), and the applied paste was dried for 15 minutes at 130° C. The single cell and support substrate were then laminated so that their printed surfaces of the silver paste were opposed to each other, and the lamination was sintered for 5 hours at 1,000° C. in an electric furnace. The outer surfaces of the support substrate were then polished with abrasive paper (No. 320) to accomplish a cell according to Example 1. The silver paste functions as a welding layer.

(3) Manufacturing of the Cell According to Example 2

A single cell was prepared in the same manner as Example 1. A silver paste was then applied to one surface of each of the single cell and the support substrate by screen printing to form a grid pattern, and the applied paste was dried for 15 minutes at 130° C. Then, as in Example 1, the single cell and support substrate were laminated so that their printed surfaces of silver paste were opposed to each other, and the lamination was sintered for 5 hours at 1,000° C. in an electric furnace. A gold paste was subsequently screen-printed so as to fill the through-holes in the support substrate, and the gold paste was made porous by sintering for 1 hour at 900° C. A cell according to Example 2 was thus accomplished.

(3) Manufacturing of the Cell According to Example 3

A single cell according to Example 1 was prepared in the same manner as Example 1. The welding sheet was then sandwiched between the single cell and the support substrate, and these components were sintered for 5 hours at 1,000° C. in an electric furnace. The outer surfaces of the support substrate were then polished with abrasive paper (No. 320) to accomplish a cell according to Example 3.

(4) Manufacturing of the Cell According to Example 4

After the preparation of a cell according to the same process as Example 3, a gold paste was screen-printed so as to fill the through-holes in the support substrate. The gold paste was then made porous by sintering for 1 hour at 900° C. A cell according to Example 4 was thus accomplished.

(5) Manufacturing of the Cell According to Comparative Example

A single cell was prepared as in Example 1 and used as a cell according to the Comparative Example. That is to say, the cell according to the Comparative Example did not have a support substrate.

(6) Evaluation of the Cells According to Examples 1 and 3

Figure 13:
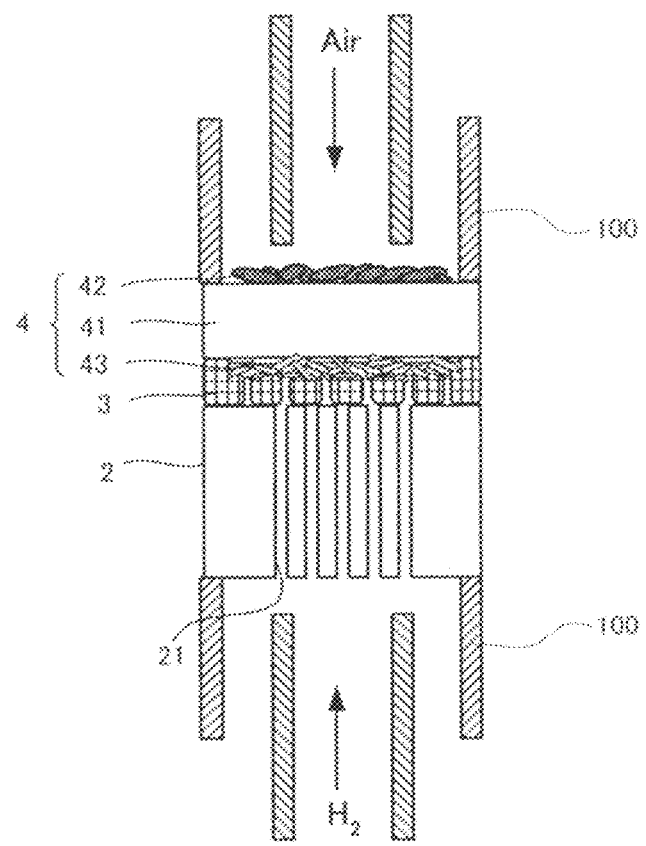
FIG. 13 is a side view showing how the evaluation tests were performed on the cells according to Examples 1 and 3.
Figure 14:
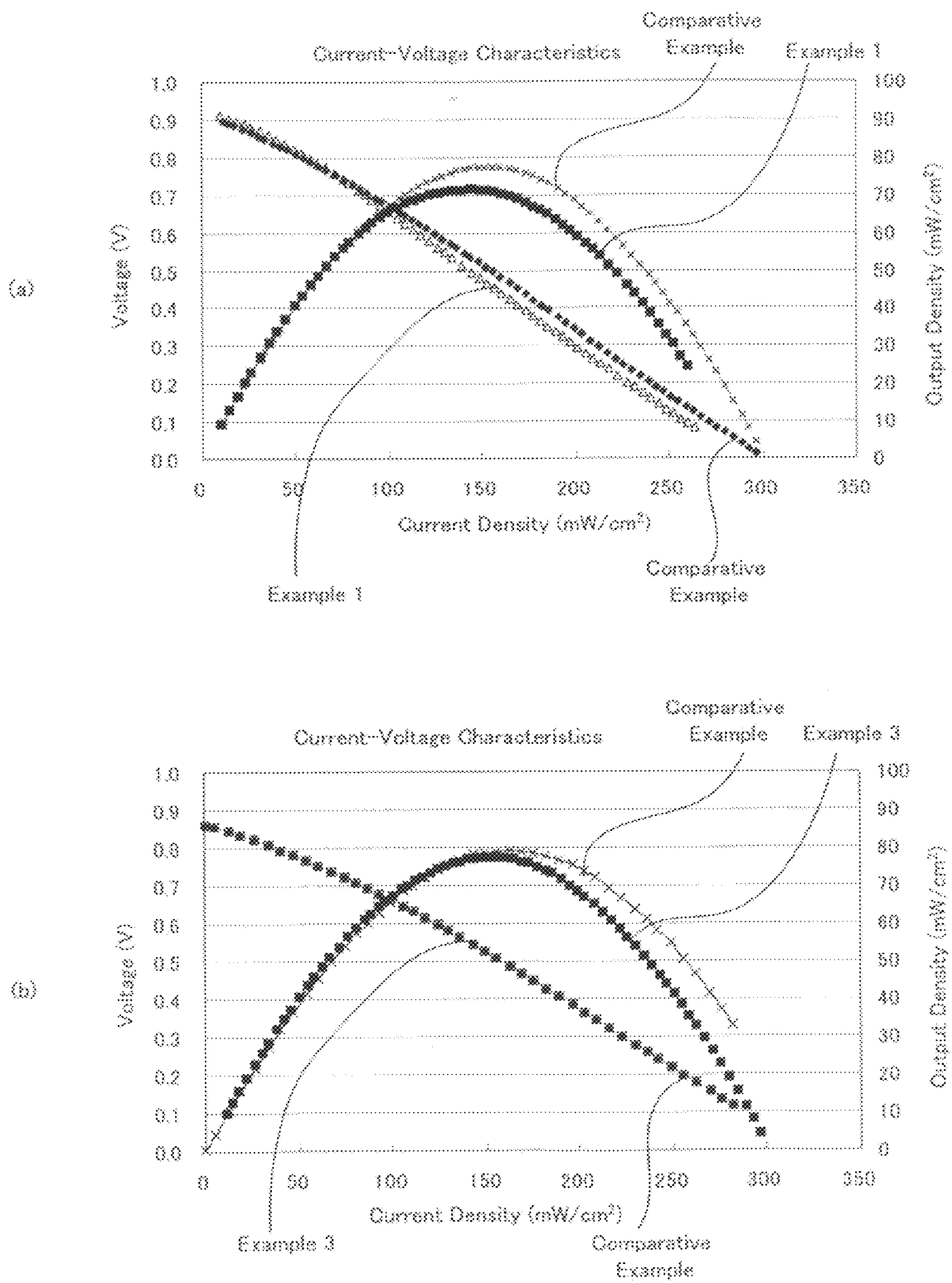
FIGS. 14(a) and (b) are graphs comparing the voltage-current characteristics of the cells according to Examples 1 or 3 and the Comparative Example.

To operate the cells according to Examples 1 and 3, 100 ml/min of hydrogen was supplied to the anode side, and 100 ml/min of air was supplied to the cathode side. More specifically, as shown in FIG. 13, these cells were two-chamber fuel cells, wherein seal materials 100 were located to surround the electrodes in order to prevent hydrogen and air from mixing, and hydrogen and air were supplied to the respective electrodes from the vertical direction (FIG. 13 shows the cell according to Example 1; the cell according to Example 3 was also the same). The current-voltage characteristics at 600° C. of these cells were then evaluated. Evaluation was also performed on the cell according to the Comparative Example, under the same conditions as above. The results are shown in FIG. 14 (FIG. 14(*a*): Example 1, FIG. 14(*b*): Example 3). Generally, when a support substrate is used, because there is resistance between a single cell and the support substrate, the current-voltage characteristics become poorer than when a single cell is used alone, as in the Comparative Example. In the cells according to Examples 1 and 3, however, Ag was used as the welding layer to reduce the resistance between the single cell and the support substrate; therefore, these cells exhibited performance almost equal to that of the cell according to Comparative Example 1. Moreover, the cells according to Examples 1 to 3 exhibited improved mechanical strength because they had a support substrate.

(7) Evaluation of the Cells According to Examples 2 and 4

Figure 15:
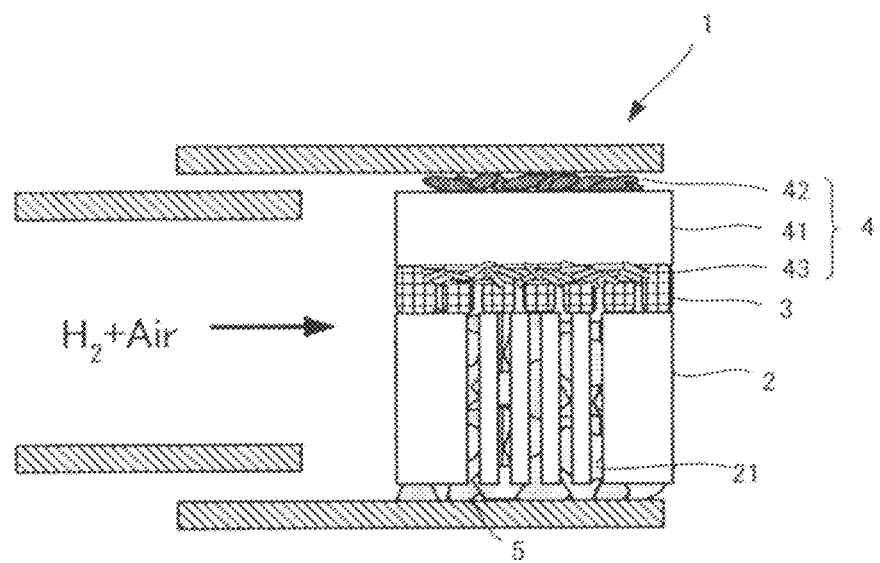
FIG. 15 is a side view showing how the evaluation tests were performed on the cells according to Examples 2 and 4.

To operate the cells according to Examples 2 and 4, as shown in FIG. 15, a gas mixture of methane and air was supplied to the cells from the surface direction at 60° C. and at a total gas flow rate of 300 cc/min, so that the flow rate ratio of methane to oxygen was 2:1 (FIG. 15 shows the cell according to Example 2; the cell according to Example 4 was also the same). The current-voltage characteristics of the cells were then evaluated. Evaluation was also performed on the cell according to Comparative Example, under the same conditions. The results are shown in FIG. 16 (FIG. 16(*a*): Example 2; FIG. 16(*b*): Example 4). Although the cells according to Examples 2 and 4 had a support substrate, they exhibited performance almost equal to that of the cell according to Comparative Example 1. Moreover, the cells according to Examples 2 and 4 exhibited improved mechanical strength because they had a support substrate.

What is claimed is:

1. A solid oxide fuel cell supplied with a fuel gas and an oxidant gas, the solid oxide fuel cell comprising:
    an electrolyte-supported or electrode-supported single cell having an anode, an electrolyte, and a cathode in this order;
    a support substrate supporting the single cell, and having a supply path for the fuel gas or the oxidant gas, wherein the support substrate has at least one through-hole, the through-hole communicating and forming the supply path;
    a conductive welding layer with gas permeability, the welding layer being sandwiched between the single cell and the support substrate, and welded to the single cell and the support substrate; and
    a porous conductive collector filling the through-hole in the support substrate.

2. A solid oxide fuel cell supplied with a fuel gas and an oxidant gas, the solid oxide fuel cell comprising:
    an electrolyte-supported or electrode-supported single cell having an anode, an electrolyte, and a cathode in this order;
    a pair of support substrates sandwiching the single cell on an anode side and a cathode side, and having a supply path for the fuel gas or the oxidant gas, wherein each support substrate has at least one through-hole, the through-hole communicating and forming the supply path;
    conductive welding layers with gas permeability, each welding layer being sandwiched between the single cell and each support substrate, and welded to the single cell and the support substrate; and
    a porous conductive collector filling the through-hole in each support substrate.

3. The solid oxide fuel cell according to claim 1 or 2, wherein the welding layer have a predetermined pattern communicating between the single cell and the support substrate.

4. The solid oxide fuel cell according to claim 1 or 2, wherein the welding layer is made of a sheet material.

5. The solid oxide fuel cell according to claim 1 or 2, wherein the welding layer comprises silver or a compound containing silver.

6. The solid oxide fuel cell according to claim 1 or 2, wherein the welding layer have a melting point of 1,200° C. or less.

7. The solid oxide fuel cell according to claim 1 or 2, wherein the support substrate is porous, and a plurality of pores in the support substrate form the supply path.

8. The solid oxide fuel cell according to claim 1 or 2, wherein the collector has a thickness equal to or greater than that of the support substrate.

9. A method for manufacturing a solid oxide fuel cell comprising the steps of:
    preparing an electrolyte-supported or electrode-supported single cell having a anode, an electrolyte, and an cathode in this order;
    preparing a support substrate for supporting the single cell;
    forming at least one through-hole in the support substrate;
    forming a conductive welding layer with gas permeability on at least one of the support substrate and the single cell;
    laminating the support substrate and the single cell so that the welding layer is sandwiched therebetween, and melting the welding layer to thereby weld the melting layer to the support substrate and the single cell; and
    forming a porous collector so as to fill the through-hole in the support substrate.

10. A method for manufacturing a solid oxide fuel cell comprising:
    preparing an electrolyte-supported or electrode-supported single cell having a anode, an electrolyte, and an cathode in this order;
    preparing two support substrates for supporting the single cell;
    forming at least one through-hole in each of the support substrates; forming conductive welding layers with gas permeability, each welding layer being formed between each of the support substrates and the single cell;
    laminating the two support substrates and the single cell so that the support substrates sandwich the single cell, and each welding layer is sandwiched between each support substrate and the single cell, and melting the welding layers to thereby weld the welding layers to the respective support substrates and the single cell; and
    forming a porous collector so as to fill the through-hole in each of the support substrates.

11. The method according to claim 10, wherein the step of forming welding layers comprises forming a welding layer on at least one of opposing surfaces of each support substrate and the single cell.

12. The method according to claim 10, wherein each of the welding layers has a predetermined pattern communicating the single cell and the support substrate.

13. The method according to claim 10, wherein the welding layer is made of a sheet material.

* * * * *